United States Patent [19]

Shimada

[11] Patent Number: 4,818,331
[45] Date of Patent: Apr. 4, 1989

[54] APPARATUS FOR MANUFACTURING A SEAT

[75] Inventor: Makoto Shimada, Akishima, Japan

[73] Assignee: Tachi-S Co., Ltd., Akishima, Japan

[21] Appl. No.: 41,771

[22] Filed: Apr. 23, 1987

[51] Int. Cl.⁴ .................. B65C 1/00; B32B 3/04; B29C 1/00; C09J 7/02

[52] U.S. Cl. .................... 156/485; 156/213; 156/475; 156/494; 29/91.8; 264/267; 425/353

[58] Field of Search ............ 156/494, 229, 213, 196, 156/212, 221, 443, 469, 475, 583.91, 381, 483, 484, 485; 100/232, 264, 229; 264/361, 46.6, 267, 321, 325, 266, 247; 425/426, 427, 429, 353; 249/82; 29/91.7, 91.5, 91.8

[56] References Cited

U.S. PATENT DOCUMENTS

| | | | |
|---|---|---|---|
| 3,854,391 | 12/1974 | Ackroyd | 100/232 |
| 4,086,850 | 5/1978 | Becker et al. | 100/232 |
| 4,414,028 | 11/1983 | Inoue | 100/232 |
| 4,537,646 | 8/1985 | Hoyle | 156/303.1 |
| 4,545,105 | 10/1985 | Kowalsky | 156/212 |
| 4,619,725 | 9/1985 | Muraishi et al. | 156/228 |

FOREIGN PATENT DOCUMENTS 846405  8/1960  United Kingdom ............... 156/213

Primary Examiner—Michael W. Ball
Assistant Examiner—Louis Falasco
Attorney, Agent, or Firm—Oldham & Oldham Co.

[57] ABSTRACT

Disclosed is an apparatus for manufacturing a seat such as an automotive seat in which the seat is assembled by bonding a top cover member to the surfaces of a cushion member. In such apparatus, provided are stretching means for stretching the top cover member, the stretching means being disposed on a lower die in such a manner as to surround the hollow portion of the lower die, the hollow portion being adapted for accommodating the cushion member. By virtue of the stretching means, the top cover member is bonded to the cushion member with no wrinkle and no slack portion being formed in the top cover member.

11 Claims, 3 Drawing Sheets

APPARATUS FOR MANUFACTURING A SEAT

BACKGROUND OF THE INVENTION

1. Field of the Invention

The present invention relates to an apparatus for forming an automotive seat and in particular to an apparatus for manufacturing a seat by bonding a foam cushion member to a top cover member.

2. Description of the Prior Art

Referring to FIG. 1, is illustrative of a finished seat for automobile (A) which is formed by bonding a foam cushion member (b) (made of urethane foam, for example) with a recess formed centrally of its upper surface, to a top cover member (a). In order to produce such automotive seat (A), it has been a common step, as shown in FIG. 2, in a conventional seat forming apparatus that the top cover member (a) is turned upside down and placed on a lower die (21) provided on a base (26), the cushion member(b) is removably secured to an upper die (22) disposed above the lower die (21), then an adhesive is applied to either or both of the top cover member (a) and cushion member (b), where appropriate, and thereafter while lowering and pressing the upper die (22) against the lower die (21), the cushion member (b) is pressed and bonded to the top cover member (a).

However, the conventional apparatus of this type has a drawback in that bonding is not effected between the side walls of the cushion member (b) and the side lateral portions (a2) of the top cover member (a) while completed is bonding between the upper surface of the cushion member (b) and the central seating portion (a1) of the top cover member (a), with the result that it requires an additional process, whether it be made manually or otherwise, for bonding the side lateral portions (a2) to the associated walls of the cushion member (b) and consequently after bonding, there are created some slack areas in the top cover member (a).

To avoid the foregoing drawback, such apparatus as shown in FIG. 3 has been proposed, which has a lower die (23) with a hollow portion (23a) formed therein for accomdating a work, namely, the top cover and cushion members (a,b). With this apparatus, the top cover member (a) is affixed over the cushion member (b) such that it covers the four side walls as well as top wall of the cushion member (b) where an adhesive has been applied, and those prepared members (a)(b) are accomodated within the hollow portion (23a) of the lower die (23). In operation, upon lowering and pressing an upper die (24) against the lower die (23), a pressure is given to the central seating portion (a1) of the top cover member (a) so that, bonded are the central seating portion (a1) and the side lateral portions (a2) of the top cover member (a), respectively, to the top surface and the four side walls of the cushion member (b).

However, the above-mentioned second conventional apparatus is found disadvantageous in that it is only applicable to a top cover member having more than 100% expandable property in the case of the cushion member (b), as seen in FIG. 3, having uneven top surfaces and thus the top cover member (a) having to be bonded fully to the cushion member in conformity with such uneven top surfaces thereof.

In FIG. 1, reference character (c) denotes a frame made of a metal or rigid plastics, on which frame there is porvided a support member (e) such as a metallic spring for receiving the cushion member (b) thereupon. The ends of the top cover member (a) are fixedly secured to the frame (c) by means of a fixing member such as a hog ring.

SUMMARY OF THE INVENTION

It is a purpose of the present invention to provide an improved apparatus for manufacturing a seat which permits bonding to a top cover member having a relatively less expandable property, not only to the top wall of a cushion member but also to the side walls thereof.

To achieve the above-mentioned purpose, in accordance with the present invention, there are provided a die adapted for accomodating both of the top cover member and cushion member, and further a pressing means which are arranged in the inner walls of such die so as to press and push the side lateral portions of the top cover member against the side walls of the cushion member, to thereby effect a bonding therebetween. Accordingly, with such arrangement, the central seating portion of the top cover member is firstly bonded to the top wall of the cushion member by moving an upper die into a lower die of such construction, and then, operation of the pressing means completes bonding of the side lateral portions of top cover member to the corresponding side walls of cushion member.

It is another purpose of the present invention to provide a seat manufacturing apparatus so designed to prevent formation of wrinkles and slack portions in a top cover member in the process of bonding the central seating portions and side lateral portions of the top cover member to the corresponding walls of a cushion member.

To this end, in accordance with the present invention, arranged are stretching means in the vicinity of the recess of a die, which are adapted to normally stretch the top cover member in the foregoing bonding process so as to eliminate wrinkles and slack portions therein. The stretching means comprise a clamp or the like for retaining the ends of the top cover member and a hydraulic or pneumatic cylinder or a spring for stretching the top cover member. Such stretching means are provided in a plural form so that they are disposed along the peripheral edges of the die, and are capable of stretching force adjustment for increasing or reducing the stretching froce against the top cover member.

DETAILED DESCRIPTION OF PREFERRED EMBODIMENTS OF THE INVENTION

Figure 1:
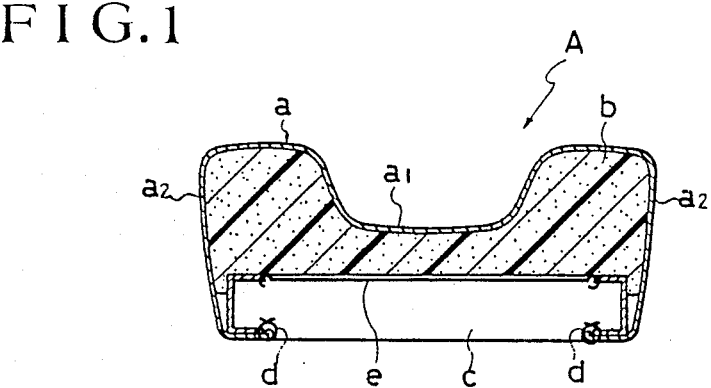
FIG. 1 is a sectional view of an automotive seat to be manfactured by an apparatus according to the present invention.
Figure 2:
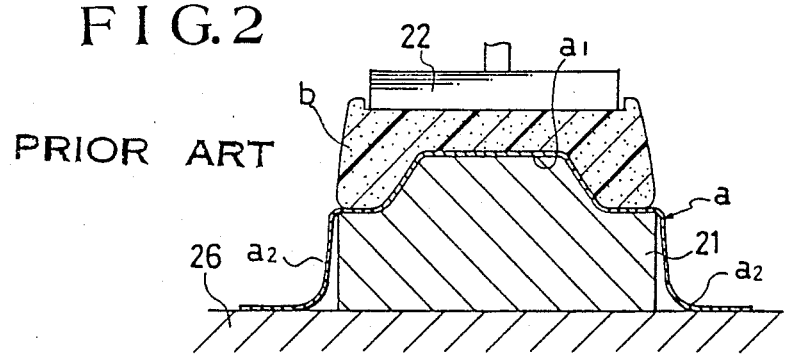
FIG. 2 and FIG. 3 are sectional views showing the manufacturing state in a conventional apparatus in which a top cover member and cushion member are being subjected to bonding process.
Figure 3:
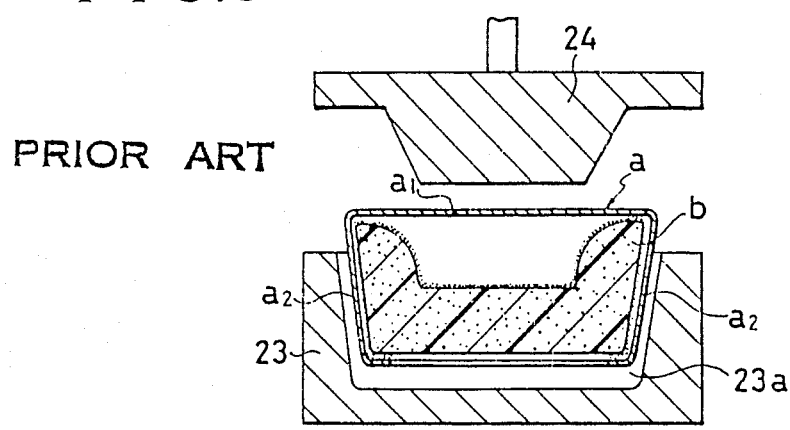
Figure 4:
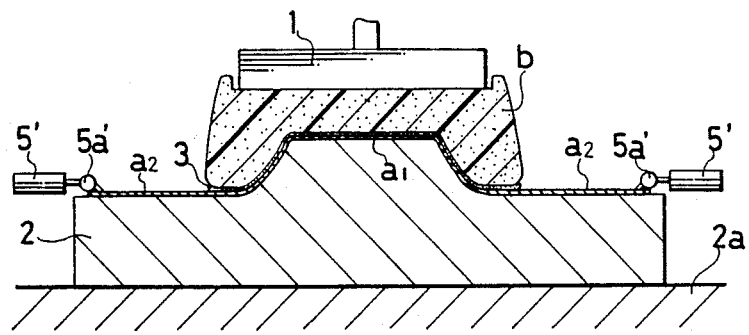
FIG. 4 is a longitudinally sectional view showing the state in accordance with the present invention, in which the central seating portion of a top cover member is bonded to a cushion member.

Referring to FIG. 4, there is illustrated an apparatus for bonding the central seating portion (a1) of a top cover member (a) to a cushion member (b). In this figure, numeral designations (1) and (2) denote respectively an upper die and a lower die mounted on a carriage (2a). Upon the upper die (1), fixedly secured is a foam cushion member (b) by securing means including such retaining means as a clamp or such drawing means as a vacuum suction device. The cushion member (b) is made of urethane foam or the like and has been formed by a mold into an outer configuration of a seat. The upper die (1) is vertically moved by means of such device as a hydraulic cylinder. As shown in the figure, the cushion member (b) is secured at its bottom portion to the upper die (1).

The lower die (2) is formed in an uneven shape corresponding to the upper surface configuration of the cushion member (b).

On the lower die (2), arranged are plurality of stretching means (5') in such a manner that they are disposed along the peripheral edges of the lower die (2). The illustrated stretching means (5') are plurality of pneumatic or hydraulic cylinders of conventional construction, each having at the end of its rod a clamp (5a') provided for holding the ends of the top cover member (a). In practice, the top cover member (a), which has been turned upside down, is placed on the lower die (2), then the ends of the top cover member (a) is retained by the clamps (5a') of the stretching means (5'), and by operating the stretching means (5'), the top cover member (a) is caused to be so stretched that no slack is created therein. Thereafter, an adhesive (3) is applied to either the central seating portion (a1) of the top cover member (a) or the corresponding top wall of the cushion member (b). Then, the upper die (1), on which the cushion member (b) is secured, is lowered towards the lower die (2) so that the cushion member (b) is pressed against and bonded to the central seating portion (a1) of the top cover member (a) in an integral manner. At completion of the bonding, the ends of the top cover member (a) are removed from the the clamps (5a') and the upper die (1) is raised away from the lower die (2), carrying those top cover member (a) and cushion member (b) all together, with the central portion (a1) of the former being bonded to the latter.

Figure 5:
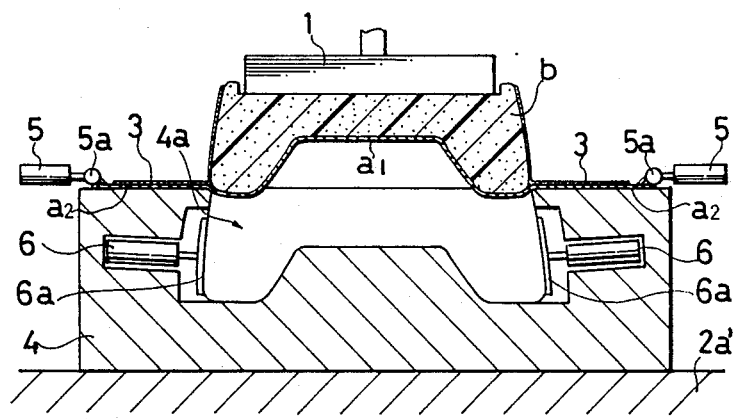
FIG. 5 is a longitudinally sectional view showing the state in accordance with the present invention, in which the top cover member in FIG. 4 is mounted on a die.
Figure 6:
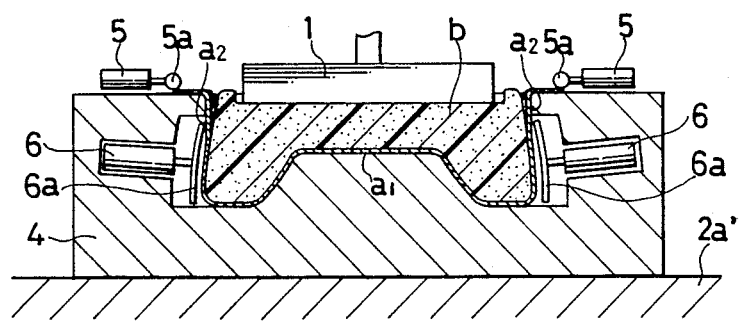
FIG. 6 is a longitudinally sectional view showing the state in which the top cover member in FIG. 5 is bonded to the cushion member within the die.
Figure 7:
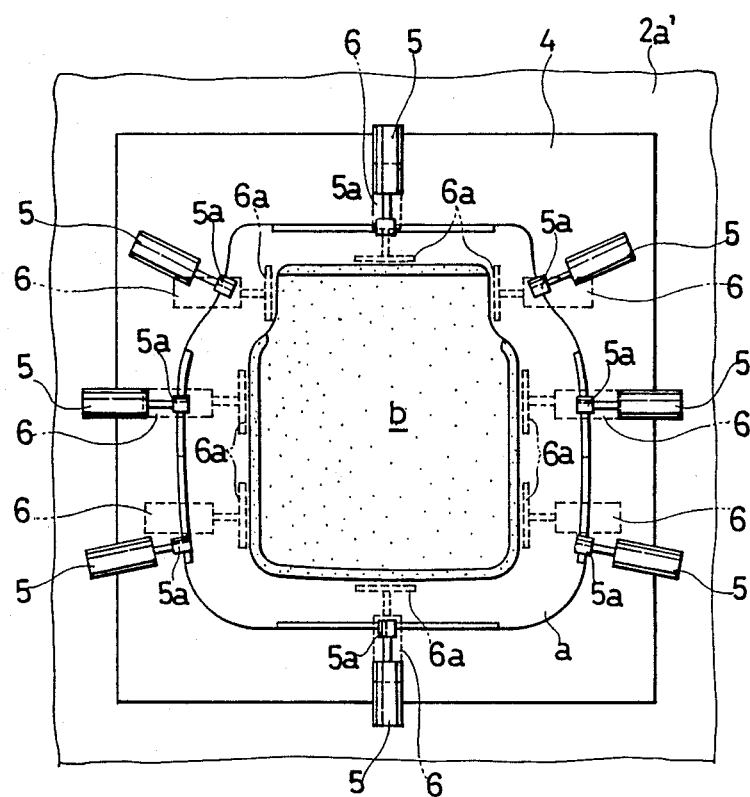
FIG. 7 is a cross-sectional plan view in connection with FIG. 6.

Referring now to FIGS. 5 through 7, illustrated is an apparatus for bonding the side lateral portions (a2) of the top cover member (a) to the four side walls of the cushion member (b).

Reference numeral (4) represents a lower die which is formed with a hollow portion (4a) having a dimensions substantially equal to the outer configuration of the cushion member (b). On the lower die (4), there are arranged a plurality of stretching means (5) similar to those (5') described above such that they are disposed along the peripheral edges of the lower die (4), as shown in FIG. 7. Reference characters (5a) designated clamps for holding the ends of the top cover member (a).

A plurality of pressing means (6)(6a) are provided within the inner side walls of the hollow portion (4a). The pressing means comprise a plurality of hydraulic or pneumatic cylinders (6) and a plurality of press plates (6a) each being provided on the respective ends of rods the cylinders (6). Such pressing means (6)(6a) may be actuated at the same time in the aggregate or may be actuated independently of each other.

Thus-constructed lower die (4) is mounted on the carriage (2a').

Now, the practical operation of the above-described apparatus will be described.

At first, the lower die (4) is moved by means of the carriage (2a') so as to be positioned below the upper die (1) on which secured is the cushion member (b) with the central seating portion (a1) of the top cover member (a) being bonded to thereto as mentioned above. Then, the ends of the top cover member (a) are retained by means of the clamps (5a) of the stretching means (5) on the lower die (4), as in FIG. 5, and the adhesive (3) is applied to the side walls of the cushion member (b) or as illustrated in FIG. 5, to the back surfaces of the side lateral portions (a2) of the top cover member (a). Thereafter, the upper die (1) is lowered so that the cushion member (b) with the top cover member (a) is accommodated within the hollow portion (4a), as shown in FIG. 6 and, when the cushion member (b) is placed in the hollow portion (4a), the top cover member (a) is then stretched by operation of the plurality of stretching means (5) to such a degree that no slack portion is left therein.

Next, the pressing means (6)(6a) are operated to press the side lateral portions (a2) of the top cover member (4) to the corresponding side walls of the cushion member (b) to thereby complete bonding them together. After such bonding process, the stretching of the top cover member (a) should also be effected by operation of the stretching means (5) in order to prevent the formation of slack in the top cover member (a).

After the above-mentioned bonding of the side lateral portions (a2) to the cushion member (b), the upper die (1) is raised and the cushion member (b) with the top cover member (a) being fully bonded thereto is removed from the hollow portion (4a). The thus-formed cushion member (b) can then be taken out from the upper die (1), whereupon the assembly of a predetermined seat is finished.

Figure 8:
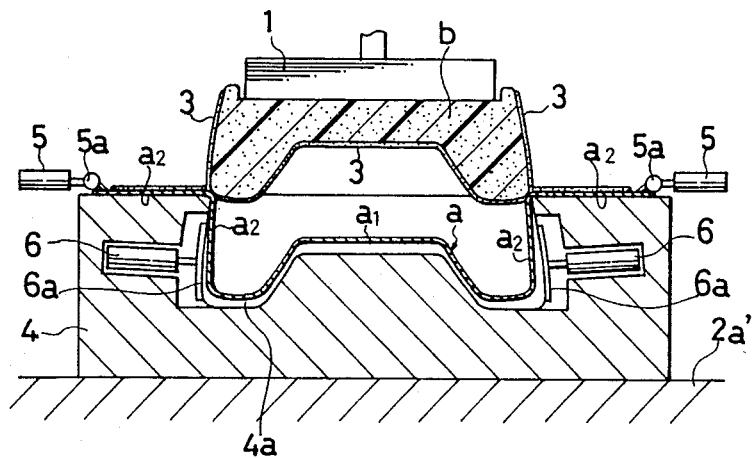
FIG. 8 is a sectional view of another embodiment of the present invention in which there is provided only one lower die and the central seating and side lateral portions of a top cover member are bonded at the same time within the lower die.

FIG. 8 illustrates the second embodiment of the present invention, in which both the central seating portion (a1) and side lateral portions (a2) of the top cover member (a) are simultaneously bonded to the cushion member (b), using the above-mentioned lower die (4).

In this embodiment, the upside-down turned top cover member (a) is initially accommodated part way in the hollow portion (4a) of the lower die (4) such that the part of the top cover member (a) is left greater in dimensions than the hollow portion (4a), and an adhesive (3) is applied to both top and side walls of the cushion member (b). Then, an upper die (1), on which the cushion member (b) is removably secured, is lowered towards the lower die (4), and simultaneously with the bodily entry of the cushion member (b) into the hollow portion (4a), the top cover member (a) is caused to be stretched by operating a stretching means (5) to such a degree that that no wrinkle or no slack portion is created in the top cover member (a) being in contact with the cushion member (b), whereby at a first stage, the central seating portion (a1) of the top cover member (a)

is suitably stretched. After such stretching, the central seating portion (a1) is pressed and bonded by the lower die to the cushion member (b) when the upper die is further lowered.

While in this bonding state, by continuing to operate the stretching means (5), the top cover member (a) is so stretched that no slack portion is produced in the side lateral portions (a2) thereof, and at the same time, by operation of pressing means (6)(6a) similar to those stated above, the side lateral portions (a2) is caused to be pressed against and bonded to the corresponding side walls of the cushion member (b). Thereafter, in the same manner as described above, the ends of the top cover member (a) are removed from the stretching means (5) and then after raising the upper die (1), the cushion member (b) with the top cover member (a) being fully bonded thereto to taken out from the upper die (1).

The stretching means (5) are not limitative to those illustrated in the drawings in so far as they have function to normally stretch the top cover member (a), and include spring means or the like.

Further, it is optional to provide a variety of stretching means (5) with different stretching forces so that each of them may be selectively arranged, depending on its suitable location in the die.

With the present invention constructed in the above-discussed manner, it is to be appreciated that the stretching of a top cover member is attained by virtue of streching means and then the stretched top cover member is bonded to a cushion member, thereby preventing formation of wrinkles and slack portions in the top cover member and thus obtaining an excellent seat with far-improved aesthetic appearance. It is also to be seen that the side lateral portions of the top cover member can be bonded to the corresponding side walls of the cushion member by virtue of pressing means provided within the inner side walls of a hollow portion of lower die. In addition, with such mechanism, it is possible to bond the top cover member to the side walls of cushion without requiring such top cover member of great expandability in contrast to the conventional apparatuses.

What is claimed is:

1. An apparatus for manufacturing a seat in which the seat is assembled by bonding a top cover member to surfaces of a foam cushion member, said apparatus comprising:

a lower die having a hollow portion for accommodating said foam cushion therein;

stretching means for retaining ends of said top cover member and stretching said top cover member, said stretching means being arranged on said lower die such that they are disposed so as to surround said hollow portion of said low die; and pressing means for pressing side lateral portions of said top cover member against side walls of said cushion member, said pressing means being arranged to surround said side walls of said cushion member and disposed within inner side walls of said hollow portion of said lower die.

2. The apparatus according to claim 1, wherein said stretching means comprise at least one cylinder adapted to retain said ends of said top cover member and stretch said top cover member.

3. The apparatus according to claim 1, wherein said pressing means comprise at least one cylinder which is arranged within inner side walls of said lower die and is adapted to press said side lateral portions of said top cover member against said side walls of said cushion member which is accommodated in said hollow portion of said lower die.

4. The apparatus according to claim 1, wherein an upper die is provided above said lower die in a vertically movable manner, and wherein said upper die is adapted for securing said cushion member thereon and transferring said cushion member into within said hollow portion of said lower die.

5. The apparatus according to claim 1, wherein said lower die is formed in an uneven shape corresponding to outer configuration of said cushion member.

6. The apparatus according to claim 1, wherein said stretching means are provided in a plural form on said lower die such that they are disposed in such a manner as to surround said hollow portion, and wherein said stretching means are adjusted their stretching forces in a different degree from one another.

7. The apparatus according to claim 1, wherein said upper die comprises more than two upper dies, wherein there are provided other lower die below one of said more two upper dies, said outer lower die being adapted for bonding a central seating portion of said top cover member to said cushion member by means of an adhesive, and wherein arranged are stretching means identical to said stretching means upon said other lower die such that they are disposed along the peripheral edges of said other lower die.

8. The apparatus according to claim 1, wherein said stretching means comprise at least one hydraulic or pneumatic cylinder.

9. The apparatus according to claim 1, wherein said stretching means comprise at least one spring member.

10. The apparatus according to claim 1, wherein said lower die is mounted on a carriage so that it is movable.

11. The appartus according to claim 7, wherein said other low die is mounted on a carriage so that it is movable relative to said one of said more than two upper dies.

* * * * *